Dec. 18, 1923.
T. S. PATTERSON
1,478,294
POWER TRANSMISSION APPARATUS
Filed Feb. 6, 1920
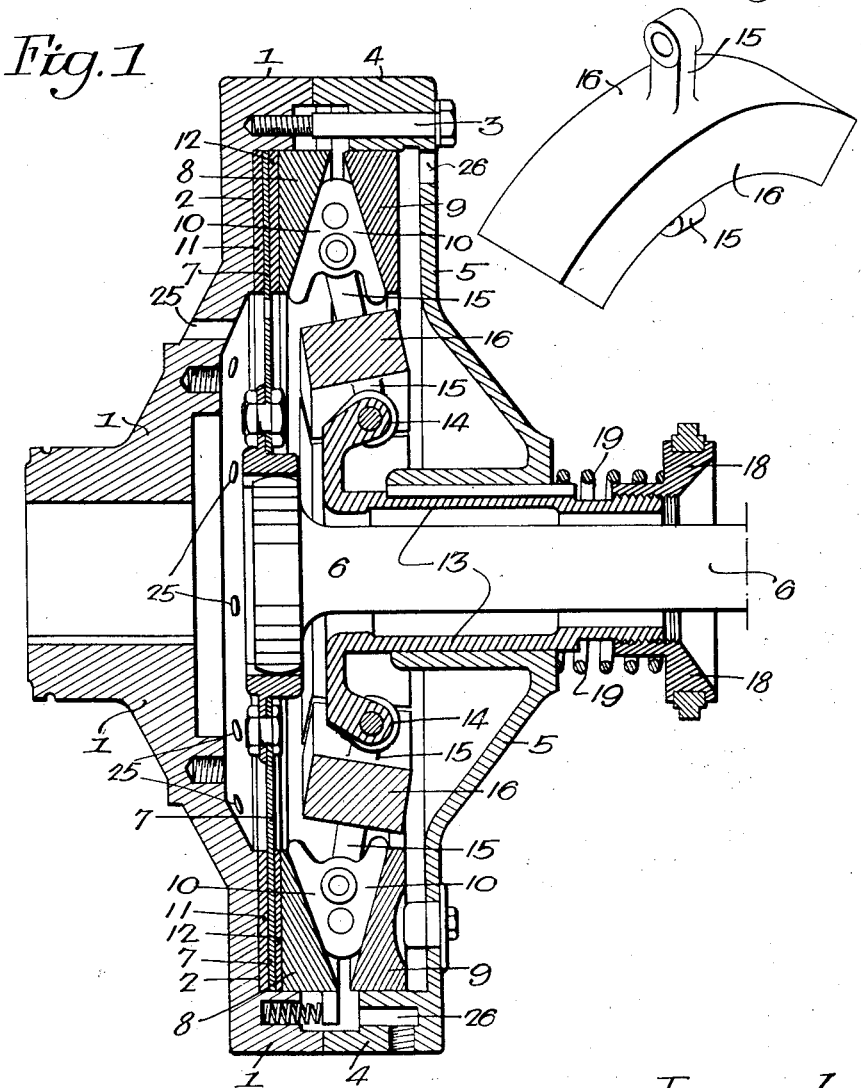
Inventor-
Thomas S. Patterson.
by his Attorneys
Howson & Howson Patented Dec. 18, 1923.

1,478,294

UNITED STATES PATENT OFFICE.

THOMAS S. PATTERSON, OF ROSEMONT, PENNSYLVANIA.

POWER-TRANSMISSION APPARATUS.

Application filed February 6, 1920. Serial No. 356,573.

*To all whom it may concern:*

Be it known that I, THOMAS S. PATTERSON, a citizen of the United States, residing in Rosemont, Pennsylvania, have invented Power-Transmission Apparatus, of which the following is a specification.

This invention relates to apparatus particularly designed for connection between a driving and a driven element, for controlling the rate at which power is transmitted between said elements when it is desired to start one of them from rest and bring it up to the speed of the other, and one object of said invention is to insure the gradual application to or delivery of power to the driven member with a view to preventing injurious stresses in the mechanism such as would arise from the sudden rigid connection of said elements.

A further object of the invention is to provide automatic mechanism of the general class noted which shall be capable of acting to automatically disconnect a driving from a driven member when the speed of said members or more especially that of the driving member falls below a predetermined point, the invention contemplating an arrangement of parts which shall insure the gradual transmission of power between said members and their ultimate connection as the speed of the driving member is increased to and past a predetermined point.

Another object of my invention is to provide a novel form of automatic clutching device designed for connection or use between a driving and a driven member and more especially between a power generating unit and the member or device actuated thereby, which shall insure the gradual connection of and transmission of power between said driving unit or member and the driven member as the former is accelerated, until said clutching device, by reason of its operation has been enabled to generate sufficient force to accomplish the connection of the members.

I further desire to provide a novel form of automatic clutch which shall be dependent on its speed of rotation for the performance of its functions; the arrangement of parts being such that as it is rotated certain of its elements, by reason of the action of centrifugal force, are caused to gradually come into action to transmit increasing amounts of power between its two parts in accordance with the acceleration of its driving element, until said two elements are operatively connected and rotate in unison.

These objects and other advantageous ends, I attain as hereinafter set forth, reference being had to the accompanying drawings, in which, Fig. 1 is a longitudinal vertical section of a clutch embodying my invention, and Fig. 2 is a perspective view of one of the weights forming part of the mechanism shown in Fig. 1.

In the above drawing 1 represents a driving member in the form of a flanged disc having a flat annular clutching surface 2. To the flange of this disc is connected in any suitable manner as by the bolts 3, a ring 4 having an inwardly extending and in the present instance, integral disc-like cover plate 5 formed with a central opening concentric with the disc 1 for the passage of a shaft 6 constituting the driven member of the apparatus.

In the casing or housing provided by the disc 1 and cover plate 5 with their associated ring 4, there is mounted upon the shaft 6 a radially extending annular plate 7 operative between the clutching face 2 of the member 1 and an annular friction plate 8 whose external face is formed as part of a conical surface. A second annular plate 9 is provided adjacent the inner face of the cover plate 5 and is formed with its surface adjacent the pressure or friction plate 8 conically shaped so as to provide a space of wedge shaped section in which are operative any suitable number of clutch wedges 10,—in the present instance four. Both of the plates 8 and 9 are movably connected to the casing 1—5 by suitable keys (not shown).

The construction of these wedges is such that when they are forced outwardly by suitable mechanism hereafter described, the pressure plate 8 is forced toward the driving member 1 and caused to cooperate with it to frictionally grip the clutch disc 7 of the driven member. In the present instance friction rings 11 and 12 are provided between the clutch disc 7, the adjacent surfaces of the pressure ring 8 and the driving member 1, and it is noted that they are preferably split or radially cut to facilitate their removal and replacement.

For controlling the operation of the wedges 10, I slidably mount a sleeve 13 in the central opening of the cover plate 5 and provide this with a suitable number of lugs 14 connected through links 15 with said wedges,—it being especially noted that when the clutch members are disconnected, these links are inclined at an acute angle to a radial plane of the clutch and each of them is provided with a weighted structure 16 preferably having a segmental shape whereby under operating conditions these links are caused to tend to assume a radial position and cause gripping of the clutching elements 8, 7 and 1. The outer end of the sleeve 13 is formed with an external flange or shoulder 18 between which and the adjacent face of the cover plate 5 is mounted a spring 19 designed to oppose the closing of the clutch until the speed of rotation of the parts thereof has resulted in the generation of sufficient centrifugal force to compel outward movement of the links 15 and weights 16 in spite of its retarding action.

With the above described arrangement of parts, if it be assumed that the driving member 1 is connected to a source of power such as an internal combustion engine and the driven element 6 is connected to the wheels of a motor vehicle, it is obvious that when the engine and consequently the driving member are first started, they will turn independently of and altogether free from the driven member. As the driving member is accelerated however, the rotation of the weights 16 generates centrifugal force sufficient to force outwardly the various wedges 10 so that these are caused to press the pressure plate 8 toward the member 1 with a force which increases as the driving member is accelerated.

As a result, power begins to be transmitted from the driving member to the driven member, and the amount of such power is increased proportionately with the acceleration or increase of speed of the driving member, since the centrifugal force acting on the weights 16 is likewise dependent on this speed. Finally by the time the driving member has reached a predetermined definite speed, the centrifugal force exerted upon the links 15 by the weights 16 reaches such a point that the wedge elements 10 cause gripping of the clutch elements 8, 7, and 1 so that the member 6 is driven at the same speed as the member 1 and thereafter acts with it as a single operative element. By forcibly moving the sleeve to the right by hand or by foot power applied to the shoulder 18, the driven shaft 6 may be disconnected from the driving member at will.

If for any reason the speed of the driving and driven members should be reduced to a predetermined extent, the centrifugal force exerted by the weights 16 upon the wedge members 10 is so diminished that these permit a greater or less relative movement of the clutch members 7, 8 and 1, thus allowing a partial disengagement of the clutch. If by the closing of the throttle the reduction of speed continues, this release of the clutch becomes more pronounced until there is complete disengagement of the members 1 and 6.

With such a combination of parts as above described it will be appreciated that a driven mechanism, such as a motor vehicle, cannot be started suddenly as is the case when a clutch of the ordinary construction is engaged by the release of the stored energy in its actuating spring. By the use of my device, on the other hand, the connection of the driving and driven members is an operation consuming an appreciable time, since it is not possible to instantaneously generate the centrifugal force necessary to cause engagement of the clutch elements. It will further be noted that by the use of my invention it is impossible to stall an internal combustion motor, while on the other hand it has been found to be possible to start a motor vehicle on high gear when on substantially level ground without involving the previous use of the low and second speed gears by reason of the fact that the clutch members are gradually, instead of suddenly, brought into power transmission engagement.

The device above described eliminates the strains due to the sudden application of power and prevents damage such as stripping of gears or breakage of relatively weak elements in the mechanism connecting the engine with the wheels of a vehicle.

Since under operating conditions clutches of the type above described are found to generate heat owing to the friction between their cooperating surfaces, I preferably so construct the parts that they automatically cool themselves under conditions of use. With this idea in view I provide a number of air inlet openings in the inner portion of the member 1, relatively near its axis of rotation as indicated at 25. The clutch disc or ring 7 is formed with perforations or openings to allow of the passage of air, and the cover plate 5 at the outer portions thereof relatively distant from its axis of rotation, has a second series of openings 26. Under operating conditions the rotation of the links 15 with their associated parts so acts on the air within the housing of the clutch as to cause its expulsion through the holes 26 with a consequent inflow through the openings 25, and the resulting circulation abstracts the heat from the clutch elements and maintains the device as a whole at a relatively low temperature.

I claim:—

1. The combination in a clutch of a driving member; a driven member; means for operatively connecting said members including two rings of wedge-shaped section; a series of wedges operative between said rings; a controlling sleeve for the clutch;

links each including a segmental weight connecting the sleeve with the wedges respectively; and means opposing movement of the sleeve under the centrifugal action of the weights.

2. The combination in a clutch of a driving member including a fly wheel casing; a driven member extending into said casing; and means within the casing for operatively connecting the latter with the driven member, said means including two spaced plates and weights rotatably connected with the casing, said weights being mounted to force said plates apart under the action of centrifugal force and being connected to cause automatic and gradual connection of the driving and driven members as the fly wheel is accelerated; with a spring opposing operation of said weights.

3. The combination in a clutch of a fly wheel; two substantially parallel rings having their adjacent faces inclined at an acute angle; clutch wedges operative between said adjacent faces of the rings; weighted structures tending to move said wedges outwardly under the action of centrifugal force; a clutch ring positioned to be frictionally gripped to the fly wheel by the action of said wedges on said rings; with manually operative means for controlling said wedges.

THOMAS S. PATTERSON.